United States Patent
Hagens et al.

(10) Patent No.: US 12,423,208 B2
(45) Date of Patent: Sep. 23, 2025

(54) METHOD FOR GRAPHICALLY PROVIDING STATUS INFORMATION OF A DATA PROCESSING SYSTEM

(71) Applicant: Canon Production Printing Holding B.V., Venlo (NL)

(72) Inventors: Pascal A.M.S. Hagens, Venlo (NL); Jeroen Blom, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 183 days.

(21) Appl. No.: 18/239,491

(22) Filed: Aug. 29, 2023

(65) Prior Publication Data
US 2024/0086294 A1    Mar. 14, 2024

(30) Foreign Application Priority Data
Sep. 12, 2022  (EP) ..................... 22195217

(51) Int. Cl.
G06F 11/32 (2006.01)
G06F 11/34 (2006.01)
G06T 11/20 (2006.01)

(52) U.S. Cl.
CPC ............ *G06F 11/328* (2013.01); *G06F 11/34* (2013.01); *G06F 11/3428* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 4,074,358 A * | 2/1978 | Caputo | H04L 1/205 327/31 |
| 5,828,864 A | 10/1998 | Danknick et al. | |
| 5,859,623 A * | 1/1999 | Meyn | G06F 3/14 345/698 |
| 2002/0018223 A1* | 2/2002 | Kashihara | G06F 3/1239 358/1.9 |
| 2012/0109889 A1 | 5/2012 | Wu et al. | |
| 2015/0121518 A1* | 4/2015 | Shmueli | H04L 63/1425 726/22 |

(Continued)

OTHER PUBLICATIONS

Cai, X.; A Study of the Effect of Doughnut Chart Parameters on Proportion Estimation Accuracy; Jan. 2018; Computer Graphics Forum, 37(6), p. 1-11; https://core.ac.uk/download/pdf/232518418.pdf (Year: 2018).*

(Continued)

*Primary Examiner* — Joni Hsu
(74) *Attorney, Agent, or Firm* — Birch, Stewart, Kolasch & Birch, LLP

(57) ABSTRACT

Method for graphically providing status information of a data processing system having a plurality of disjunct system statuses, wherein the data processing system is monitored during a predetermined period of time. A donut chart is created which has an inner hole region linked to the one particular system status and an outer region having as many segments as the total number of system statuses in the collection minus one. An area size of the inner hole region and an area size of each segment in the outer region is proportional to the amount of time that the corresponding monitored system status occurred during the predetermined period of time.

20 Claims, 6 Drawing Sheets

(56) References Cited

U.S. PATENT DOCUMENTS

2020/0409514 A1    12/2020  Naganuma et al.
2021/0231335 A1*  7/2021  Ulrich .................... G01D 21/00
2021/0375080 A1*  12/2021  Kumar ................... G05D 1/644
2022/0114527 A1*  4/2022  Haidar ........... G06Q 10/063114

OTHER PUBLICATIONS

Mao, Zeyu; W4IPS: A Web-based Interactive Power System Simulation Environment For Power System Security Analysis; Sep. 2019; Hawaii International Conference on System Sciences; p. 1-9; https://arxiv.org/pdf/1909.06952 (Year: 2019).*

European Search Report, issued in Application No. 22 19 5217, dated Feb. 1, 2023.

Skau et al., "Arcs, Angles, or Areas: Individual Data Encodings in Pie and Donut Charts", Computer Graphics Forum, 2016, vol. 35, No. 3, pp. 121-130.

Waldner et al., "A Comparison of Radial and Linear Charts for Visualizing Daily Patterns", arXiv:1907.13534v1 [cs.GR], Jul. 31, 2019, total 10 pages.

* cited by examiner

METHOD FOR GRAPHICALLY PROVIDING STATUS INFORMATION OF A DATA PROCESSING SYSTEM

BACKGROUND OF THE INVENTION

The present disclosure relates generally to data processing systems, and in particular, to graphically displaying data in a graphical user interface. Still more particularly, the present disclosure relates to a method and apparatus for providing status information of the data processing system by means of a donut chart displayed graphically in a graphical user interface.

Information from statuses of data processing systems may be displayed graphically in a number of different ways. For example, bar graphs, line graphs, circular charts like pie charts and donut charts, and other types of charts or graphs may be used to provide a graphical representation of the information.

Circular charts include pie charts and donut charts. These types of circular charts are divided into segments. Each segment typically illustrates a numerical proportion to the quantity represented by the segment. In particular, the arc length of each segment represents the quantity as a proportion relative to other quantities represented by arc lengths in the circular chart. A segment of a circular chart may hereinafter also be called a section of a circular chart.

Presenting the circular charts as accurately as possible and conveying information as efficiently as possible is desirable. For example, colours are often used in circular charts to convey information about what each segment represents. A colour provides information about a segment in the circular chart. Depending on the number of segments, a different colour palette may be selected.

Often, one segment has a separate meaning than the other segments, or one segment has an extremely large area when compared to the other segments, or one segment has a rather stable contribution of time to the distribution of statuses. The graphical conveyance of information through the circular chart may not be as clear when a segment is quite larger than the other segments, which can make the other segments less discernable from each other.

Therefore, it would be desirable to have a method and apparatus that take into account at least some of the issues discussed above, as well as other possible issues. For example, it would be desirable to have a method and apparatus that provide status information of the data processing system which utilizes the circular chart area as economically and accurately as possible while providing a desired aesthetic graphical display of the statuses.

SUMMARY OF THE INVENTION

It is an object of the present invention to provide a method according to claim 1. The data processing system is monitored during a predetermined period of time by a computer system which is connected to or part of the data processing system. The computer system gathers a collection of at least one system status of the data processing system monitored during the predetermined period of time and an amount of time that each monitored system status occurred during the predetermined period of time. The computer system selects out of the collection one particular system status according to a selection criterion. The criterion is related to the kind of statuses or to the amounts of time each status has been monitored.

The computer system comprises a chart generator for creating a donut chart having an inner hole region and an outer region having as many segments as the total number of system statuses in the collection minus one. The chart generator links the inner hole region to the one particular system status, and each segment of the outer region, if any, to a different system status in the collection which does not equal the one particular system status. The chart generator in the computer system communicates with a display system which may be part of the data processing system or which may be part of the computer system. The display system displays the one particular system status in the inner hole region and each system status in the collection other than the one particular system status in a corresponding linked segment of the outer region. An area size of the inner hole region and an area size of each segment in the outer region is proportional to the amount of time that the corresponding monitored system status occurred during the predetermined period of time.

Graphically displaying the statuses in the circular chart enables a desired level of comprehension of the statuses.

In yet another illustrative embodiment, a computer program product comprises a computer readable storage media. The computer program product also comprises a first program code, a second program code, a third program code, a fourth program code, a fifth program code and a sixth program code that are stored on the computer readable storage media. The first program code selects out of the collection one particular system status according to a selection criterion. The second program code creates by means of a chart generator a donut chart having an inner hole region and an outer region having as many segments as the total number of system statuses in the collection minus one. The third program code links the inner hole region to the one particular system status. The fourth program code links each segment of the outer region, if any, to a different system status in the collection which does not equal the one particular system status. The fifth program code determines an area size of the inner hole region and an area size of each segment in the outer region which are proportional to the amount of time that the corresponding monitored system status occurred during the predetermined period of time. The sixth program code displays on the display system the one particular system status in the inner hole region and each system status in the collection other than the one particular system status in a corresponding linked segment of the outer region, wherein an area size of the inner hole region and an area size of each segment in the outer region is proportional to the amount of time that the corresponding monitored system status occurred during the predetermined period of time. Graphically displaying the statuses in the donut chart enables a desired level of comprehension of the statuses.

According to an embodiment the step b) comprises the sub-steps of gathering, when the data processing system is on-line, a collection of at least one on-line system status and the corresponding amount of time, deriving from a sum of the at least one amount of time of the at least one on-line system status and the predetermined period of time, a time period for an off-line system status of the data processing system, and add the off-line system status and the derived time period to the collection.

According to an embodiment the one particular system status corresponds to the off-line system status.

According to an embodiment the method comprises the step of displaying a digital object comprising an advice for the operator of the data processing system when the amount of time that the one particular system status is monitored during the predetermined period of time area exceeds a predetermined time threshold.

According to an embodiment each segment has a different colour, the inner hole region has a colour which differs from the colours of the segments and the method comprises the step of displaying a legend comprising each colour and a description of the system status corresponding to the colour.

According to an embodiment the colour of the inner hole region is black, grey or white.

According to an embodiment each segment as well as the inner hole region are provided with a numerical indication of the amount of time that the corresponding system status is monitored during the predetermined period of time.

According to an embodiment the plurality of system statuses of the data processing system comprises an on-line system status labeled with "busy", an on-line system status labeled with "error", an on-line system status labeled with "maintenance", and an on-line system status labeled with "idle".

The present invention also relates to a data processing system comprising an electronic controller which is configured to execute the steps of the method according to the invention.

According to an embodiment the data processing system is a printing system, the electronic controller is a print controller and the system statuses are printer statuses.

The present invention also relates to a software medium comprising executable program code to cause a data processing system to execute the steps of a method according to the invention.

The features and functions can be achieved independently in various embodiments of the present disclosure or may be combined in yet other embodiments in which further details can be seen with reference to the following description and drawings.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from this detailed description.

BRIEF DESCRIPTION OF THE DRAWINGS

The present invention will become more fully understood from the detailed description given herein-below and the accompanying drawings which are given by way of illustration only, and thus are not limitative of the present invention, and wherein.

DETAILED DESCRIPTION OF PREFERRED EMBODIMENTS

Figure 1:
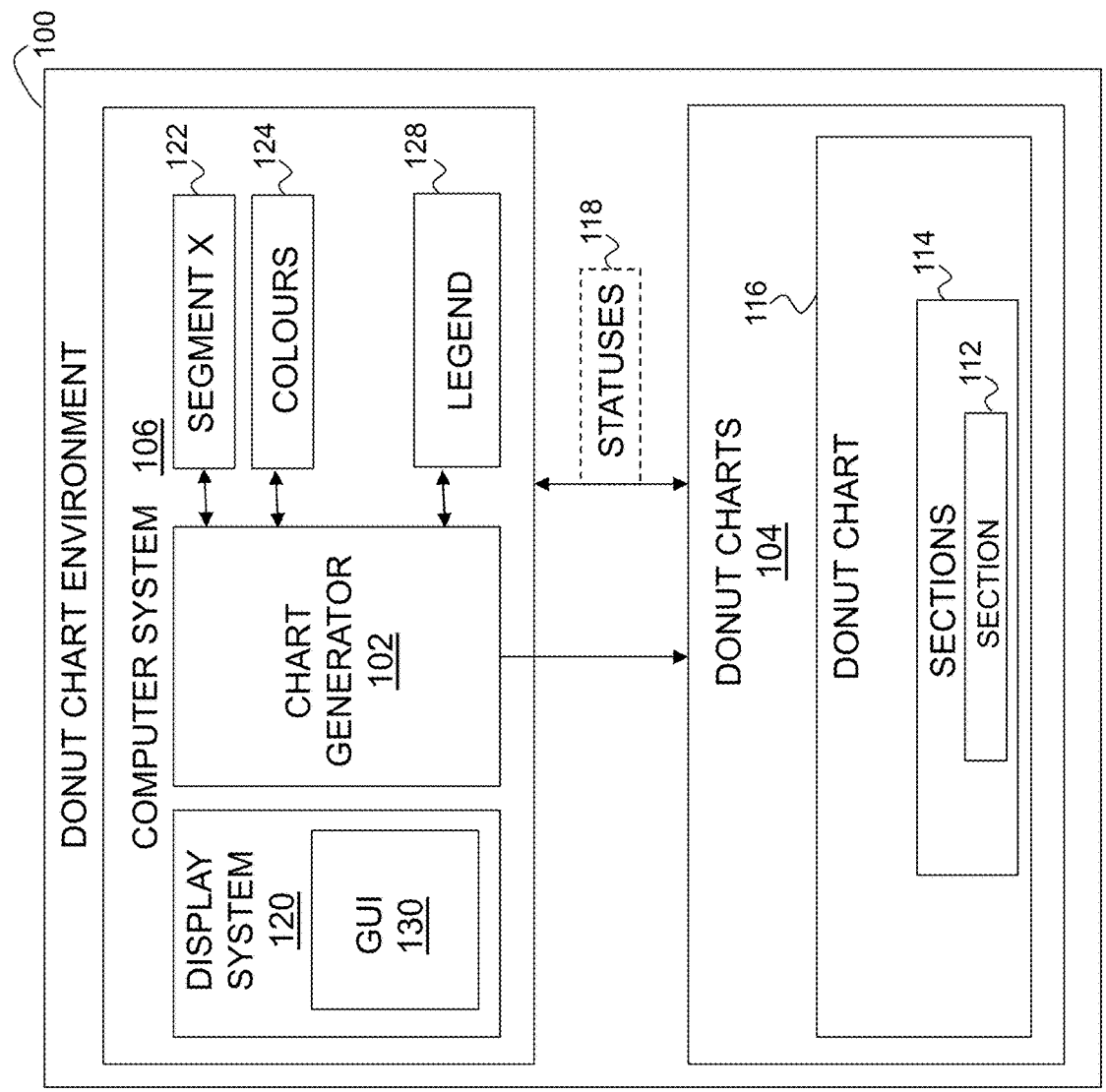
FIG. 1 shows schematically a block diagram of a donut chart environment in accordance with an illustrative embodiment.

A number of embodiments will now be described in conjunction with the drawings, in which same reference numerals refer to like elements.

With reference now to the figures, and in particular, to FIG. 1, an illustration of a block diagram of a donut chart environment is depicted in accordance with an illustrative embodiment. In donut chart environment 100, chart generator 102 generates donut charts 104.

As depicted, chart generator 102 may be implemented in software, hardware, firmware, or a combination thereof. When software is used, the operations performed by chart generator 102 may be implemented in program code configured to run on hardware, such as a processor unit. When firmware is used, the operations performed by chart generator 102 may be implemented in program code and data and stored in persistent memory to run on a processor unit. When hardware is employed, the hardware may include circuits that operate to perform the operations in chart generator 102.

In this illustrative example, chart generator 102 may be implemented in computer system 106. Computer system 106 may be comprised of one or more computers or other data processing devices. When more than one data processing device is present, those devices may communicate with each other through a communications media such as a network.

In the illustrative example of donut charts 104, a pie chart may be considered as a donut chart with an inner radius of zero, i.e. an inner hole region of size zero.

As depicted, chart generator 102 generates donut charts 104 with at least one of a desired level of aesthetics or a desired level of comprehension to a person viewing donut charts 104. In the illustrative example, chart generator 102 selects segment 112 from a group of segments 114 in donut chart 116 in donut charts 104 for statuses 118 that is to be graphically displayed on display system 120 in computer system 106. "A group of," as used herein with reference to items, means one or more items. For example, a group of segments 114 is one or more segments 114.

In the illustrative example, display system 120 may be one or more display devices. Display system 120 may be located in a data processing device in computer system 106 selected from one of a work station, a tablet computer, a mobile phone, a laptop computer, or some other suitable data processing device.

Chart generator 102 identifies a particular segment 122 to be linked to the inner hole region of the donut chart 116.

Chart generator 102 identifies for each segment in the outer region of the donut chart 116 and for the inner hole region a colour from a group of colours 124. A colour for the inner hole region is preferably white, black or grey.

Chart generator 102 may create a legend 128 for explaining the statuses indicated by the colours of the segments and the colour of the inner hole of the donut chart 116.

The chart generator 102 sends information about donut chart 116 to display system 120. Display system 120 receives this information and displays donut chart 116 in graphical user interface (GUI) 130 as a graphical display of statuses 118 in a manner that has increased comprehension and aesthetics for statuses 118 as compared to currently used techniques for displaying donut charts. As a result, donut chart 116 provides presentation statuses 118 for donut chart 116 in graphical user interface 130 when display system 120 is altered for the presentation of donut chart 116.

In this manner, graphically displaying data 118 with colours in donut chart 116 enables a desired level of comprehension of statuses 118. Additionally, a desired level of aesthetics for donut chart 116 also may be achieved in addition to a desired level of comprehension of statuses 118. In this manner, chart generator 102 may operate as a chart colouring system to place colours into segments 114 in a manner that provides at least one of a desired level of aesthetics or a desired level of information conveyance of statuses 118 in donut charts 104 that are displayed in display system 120.

As a result, computer system 106 operates as a special purpose computer system in which chart generator 102 enables displaying donut charts 104 with at least one of a greater level of aesthetics or a greater level of comprehension as compared to other computers that do not have chart generator 102. In particular, chart generator 102 alters display system 122 and displays donut chart 116 with colours.

Also, chart generator 102 enables a higher level of aesthetics in displaying donut charts 104 with a desired level of comprehension of statuses 118 as compared to currently used computers for generating charts. In this manner, chart generator 102 operates in computer system 106 and alters display system 120 to provide a presentation of statuses 118 in donut chart 116.

The illustration of donut chart environment 100 and the different components in donut chart environment 100 in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, donut charts 104 may be present in ways other than in graphical user interface 130 in display system 120. For example, donut charts 104 may be printed on paper, transparencies, or on other suitable media. As another example, chart generator 102 may also identify the amount and the sizes of segments 114 in donut charts 104 from statuses 118 for donut chart 116.

Figure 2:
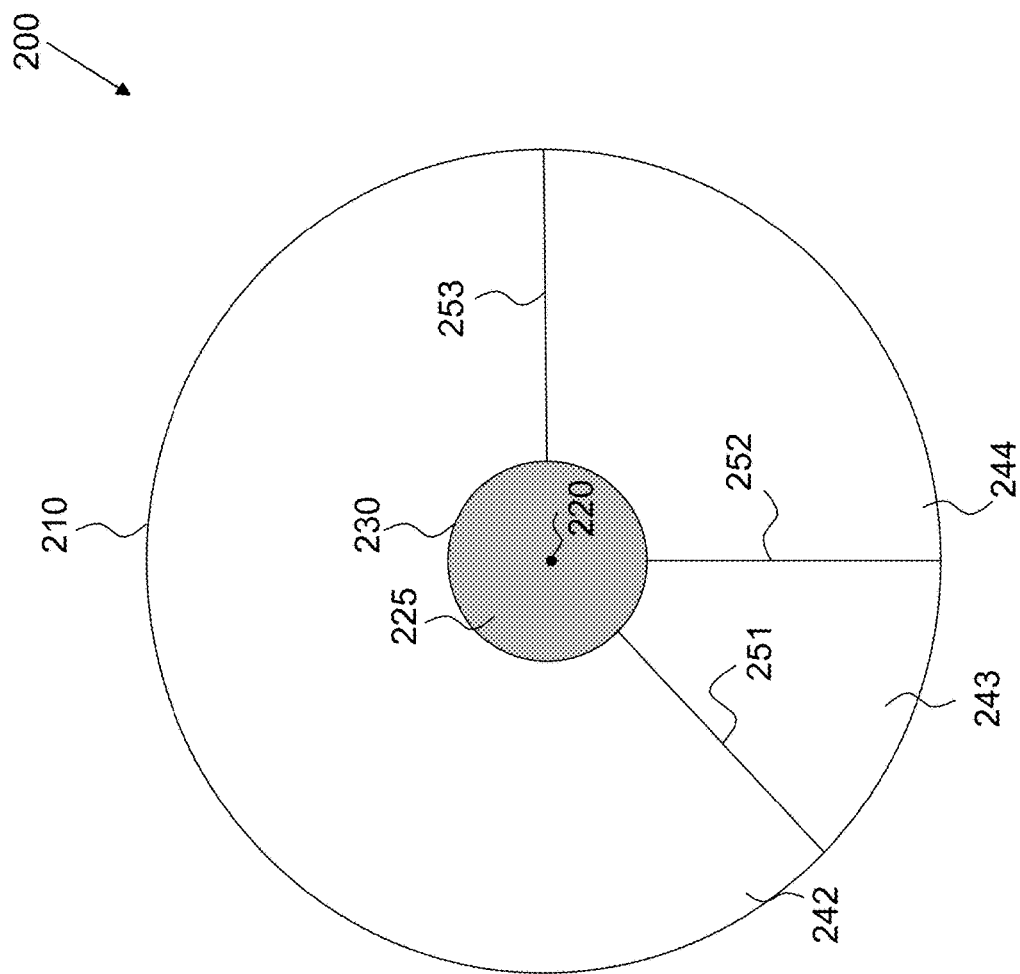
FIGS. 2-4 show schematically donut charts according to the present invention.

Turning to FIG. 2, an illustration of a donut chart is depicted in accordance with an illustrative embodiment. As depicted, donut chart 200 is an example of an implementation of donut chart 116 shown in block diagram form in FIG. 1. In this illustrative example, donut chart 200 is shown with solid lines.

In this illustrative example, donut chart 200 has outer radius circle 210 and inner radius circle 230. As depicted, donut chart 200 is displayed around center 220 of donut chart 200. A donut chart may include zero, one or more segments in the outer region between the outer radius circle 210 and the inner radius circle 230. In this illustrative example, donut chart 200 includes a plurality of segments 242, 243 and 244. As depicted, a large segment 242 is 225 degrees formed by angle 251 and angle 253. In other words, the large segment 242 of donut chart 200 are formed by angle 251 and angle 253.

An inner hole region 225—gray coloured in FIG. 2—is formed around the center 220 and extends to the inner radius circle 230.

As depicted, donut chart 200 includes the inner hole region 225 and the three segments 242, 243 and 244. The inner hole region 225 is coupled, i.e. linked to a particular selected status of the data processing system which is monitored. The segments 242, 243 and 244 are coupled, i.e. linked to other statuses of the monitored data processing system. The size of the areas of the inner hole region 225 and the size of each of the segments 242, 243, and 244 are determined by the amount of time that the corresponding status is monitored during the predetermined period of time. The predetermined period of time corresponds to the whole area inside the outer radius circle 210 of the donut chart 200. For example, a size of the segment 244 is twice as large as a size of the segment 243. Therefore, it is concluded that the status corresponding to segment 244 has been monitored during a time period which is twice as long as the time period that the status corresponding to segment 243 has been monitored. For example, the size of the inner hole region 225 is smaller than the size of the segment 243, i.e. the amount of time that the particular selected status corresponding to the inner hole region has been monitored is smaller than the amount of time that the status corresponding to the segment 243 has been monitored.

The number of three segments 242, 243, 244 is illustratively and arbitrarily selected, i.e. zero, one, two or more than three segments may be envisioned.

The inner hole region 225 may have a radius of zero or a positive radius less than or equal to the radius of the outer radius circle 210. When the radius of the inner hole region 225 is zero, i.e. the particular selected status has not been monitored, the donut chart reduces to a pie chart of one or more segments. When the radius of the inner hole region 225 equals the maximum of the outer radius circle 210, the particular selected status is the only status which has been monitored during the predetermined period of time.

The predetermined period of time may be a time period according to SI time units of seconds, minutes, hours, days, weeks, months, years, etc.

The quotient of the inner radius of the inner radius circle 230 and the outer radius of the outer radius circle 210 is equal to the square root of the quotient of the amount of time that the particular selected status has been monitored and the amount of time of the whole predetermined time period.

In the illustrative example, center 220, circle 210, circle 230, angle 251, angle 252 and angle 253 are not features actually displayed as part of donut chart 200. These features are shown in this illustration to more clearly describe how chart generator 102 generates the inner hole region 225 and the segments 242, 243, 244 within donut chart 200. These features are not displayed as part of donut chart 200 to a viewer of donut chart 200.

Figure 3:
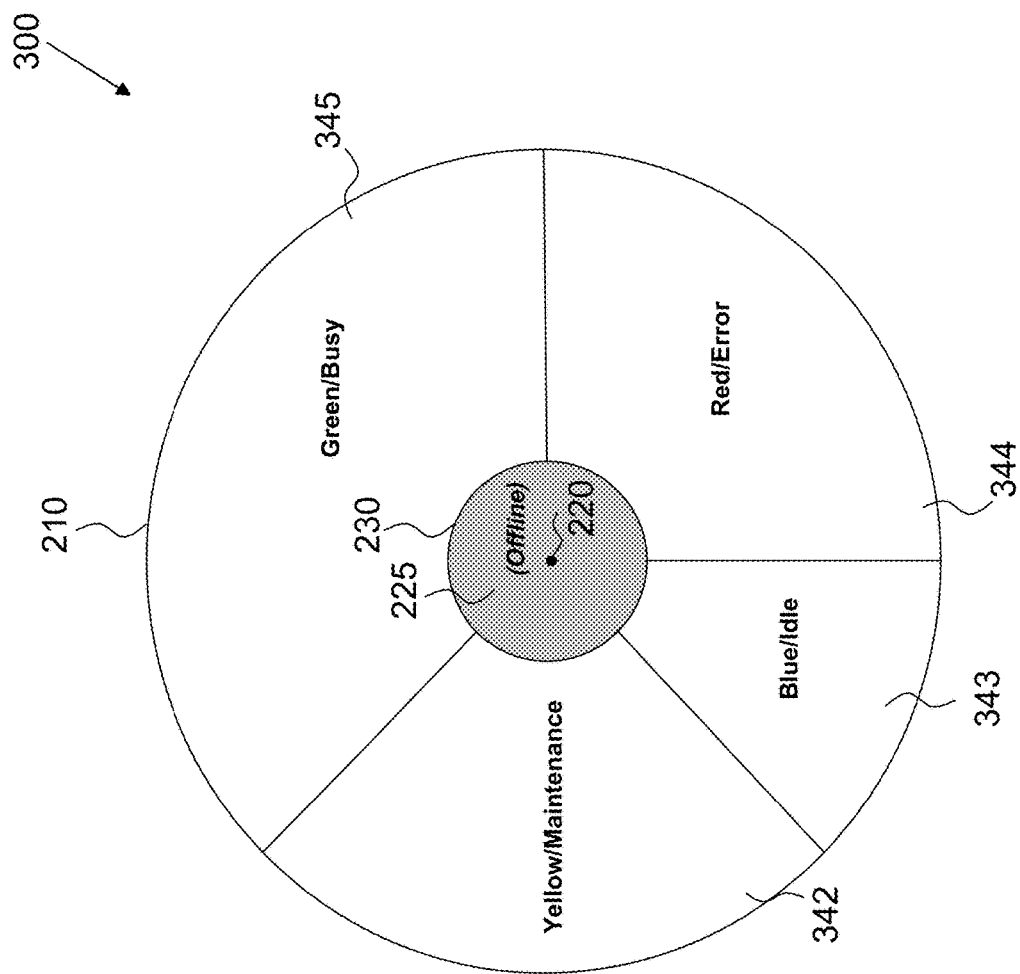

Turning next to FIG. 3, an illustration of a donut chart is depicted in accordance with an illustrative embodiment. In this example, donut chart 300 is an example of donut chart 116 shown in block form in FIG. 1.

As depicted, donut chart 300 is generated by chart generator 102 in FIG. 1. Donut chart 300 has 4 segments in this illustrative example: segment 302, segment 304, segment 306, segment 308. Donut chart 300 also has an inner hole region 310.

The donut chart 300 is providing status information for a printing system having a plurality of on-line statuses labeled as "busy", "idle", "maintenance" and "error". The fifth printer status is "off-line". The amount of time corresponding to the fifth status "off-line" is actually not monitored but derived from the predetermined period of time and the total amount of time of the four on-line statuses, i.e. the difference between the amount of time of the predetermined period of time and the total amount of time of the four on-line statuses. Segment 302 is linked to the printer status "busy", segment 304 is linked to the printer status "idle", segment 306 is linked to the printer status "maintenance", segment 308 is linked to the printer status "error". The inner hole region 310 is linked to the printer status "off-line" which has been identified as segment X 122 in FIG. 1.

Colours 124 (see FIG. 1) are selected to colour the segments 302, 304, 306, 308 of the donut chart 300. A legend 128 (See FIG. 1) may be selected to relate the colours to the four on-line statuses and the one off-line status. The inner hole region 310 corresponding in this example to the off-line status preferably gets a colour out of black, white and grey.

Traditionally the segments would have all been put on the radius of a donut chart. So OFF time would consume a certain part of the radius, and the usage during ON time is divided over the remaining radius.

In a printing environment heuristic information of the statuses of the printing system may be difficult readable. In print rooms the devices are usually used in fixed shifts of personnel. So the OFF-time of a device related to the off-line status of the device is relatively stable. Showing the off time in a traditional diagram consumes a lot of space, which leaves less room for the more information about usage during the ON time which is related to the on-line statuses of the device. This is improved by the donut chart according to FIG. 3 of showing the ON/OFF time on a different axis of the diagram (the radius of the donut) which leaves the 360 degree segmentation to be used for detailed ON time.

The inner hole region 310 becomes manifest when irregularities occur, improving heuristic quality; the information is better readable. During normal shift production the OFF/ON time relation will not be noticed or distracting. Only when a significant change in ON/OFF time happened, the changed size of the inner hole region area will inform the operator.

For convenience reasons the colours of the segments related to the four on-line statuses in donut chart 300 are represented by the bold text items "Green/Busy", "Blue/Idle" "Red/Error" and "Yellow/Maintenance".

The monitored amounts of time in hours of each status is as follows:

| Status | Colour | Amount of time (h) |
| --- | --- | --- |
| Busy | Green | 5.625 |
| Idle | Blue | 3.75 |
| Idle | Yellow | 3.75 |
| Error | Red | 1.875 |

The predetermined amount of time of the monitoring period is 16 hours.

The amount of offline time is therefore 16−5.625−375−3.75−1.875=1.0 hour.

The quotient of the radius of the inner circle 230 and the outer circle 210 is therefore the square root of 1/16=0.25.

Figure 4:
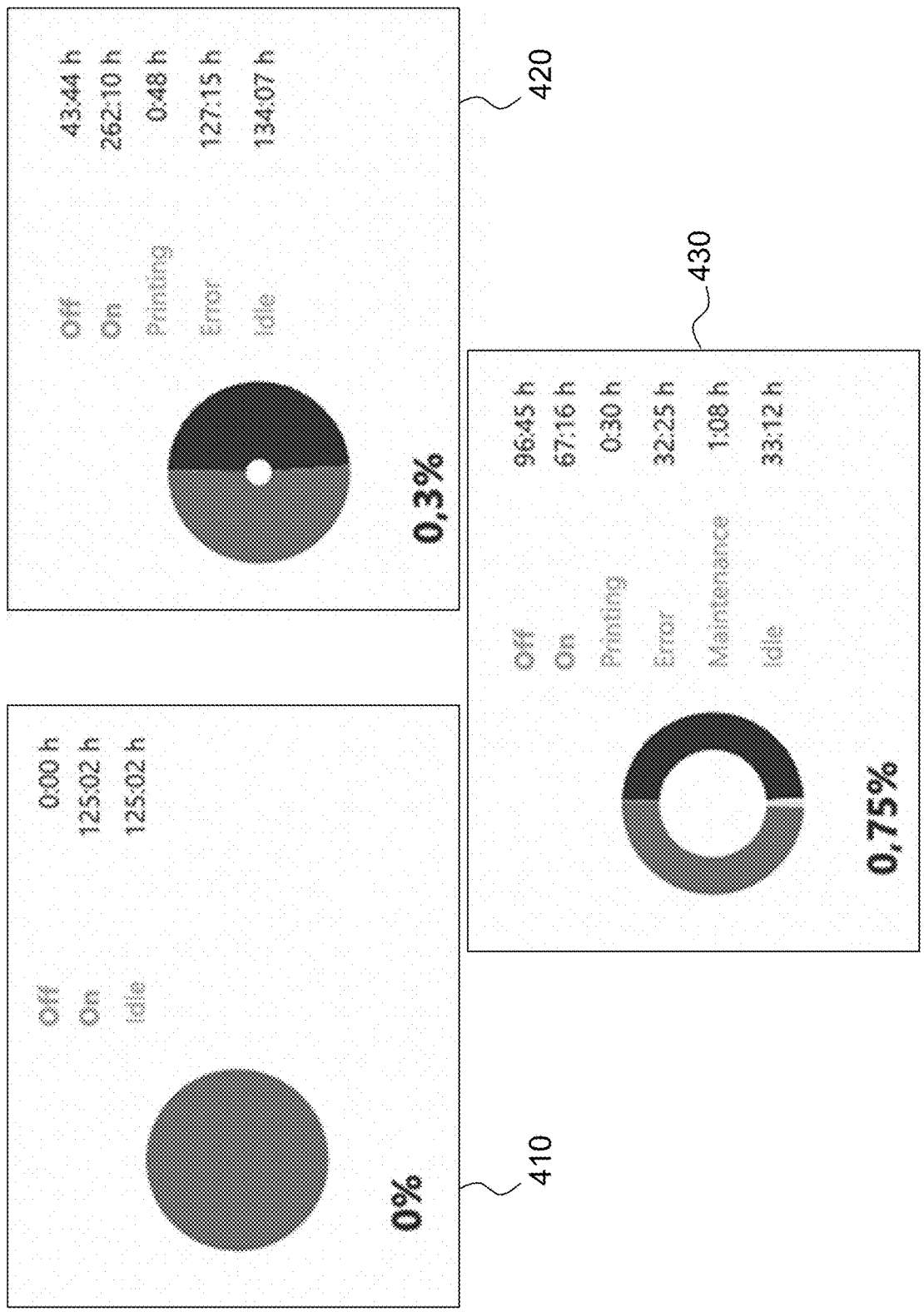

FIG. 4 shows examples of donut charts 410, 420, 430 according to the invention. The donut charts 410, 420, 430 are also provided with the amounts of time for each system status. A percentage of off-line statuses of the total time is provided to be 0%, 0.3% and 0.75% respectively. As a consequence of a higher percentage the size of the inner hole region—which is white coloured in these examples—increases from chart 410 to chart 420 to chart 430. In the chart 410 the percentage is zero and thus the inner hole region is vanished.

Figure 5:
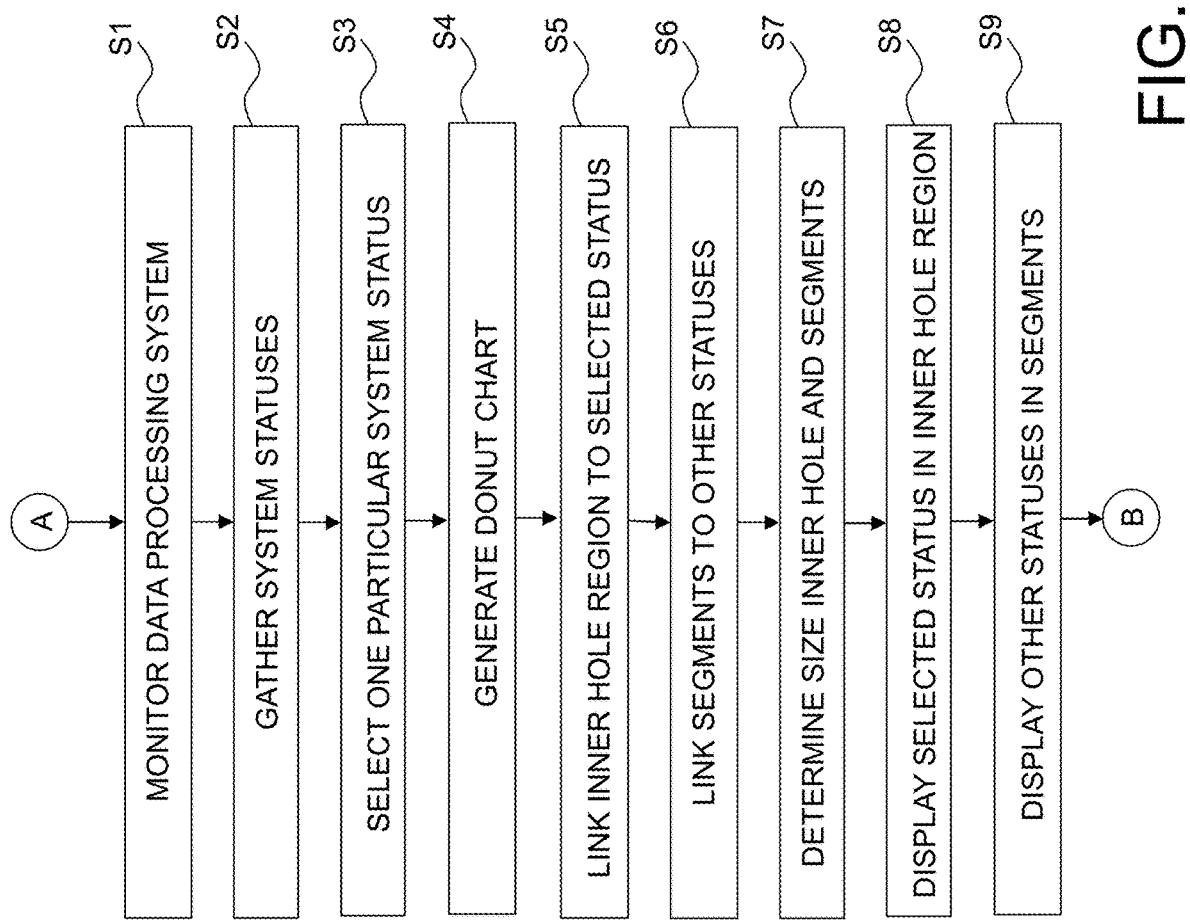
FIG. 5 is a flow diagram of a method according to the present invention.

With reference now to FIG. 5, an illustration of a flowchart of a process for graphically providing status information of a data processing system having a plurality of disjunct system statuses is depicted in accordance with an illustrative embodiment. The process illustrated in FIG. 5 may be implemented in donut chart environment 100 in FIG. 1. In particular, the process may be implemented in chart generator 102 to display statuses 118 in donut charts 104 on display system 120 in computer system 106.

The method according to the present invention starts in a start point A which leads to a first step S1.

In the first step S1 the data processing system is monitored during a predetermined period of time, for example by computer system 106.

In a second step S2 the computer system 106 gathers a collection of at least one system status of the data processing system monitored during the predetermined period of time and an amount of time that each monitored system status occurred during the predetermined period of time.

In a third step S3 the computer system selects out of the collection one particular system status according to a selection criterion. The one particular system status may be predetermined or be entered by an operator via a user interface of the computer system 106.

In a fourth step S4 the chart generator 102 generates a donut chart having an inner hole region and an outer region having as many segments as the total number of system statuses in the collection minus one.

In a fifth step S5 the computer system 106 or the chart generator 102 links the inner hole region to the one particular system status.

In a sixth step S6 the computer system 106 or the chart generator 102 links each segment of the outer region, if any, to a different system status in the collection which does not equal the one particular system status.

In a seventh step S7 the computer system 106 or the chart generator 102 determines an area size of the inner hole region and an area size of each segment in the outer region each of which area size is proportional to the amount of time that the corresponding monitored system status occurred during the predetermined period of time. The generated donut chart is submitted to the display system 120 for display via a graphical user interface GUI 130.

In a eighth step S8 the display system 120 displays the one particular system status in the inner hole region, if monitored.

In a ninth step S9 the display system 120 displays each system status in the collection other than the one particular system status in a corresponding linked segment of the outer region, if any.

The method ends in an end point B.

The flowcharts and block diagrams in FIG. 5 illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

A program code for generating donut charts may use JavaScript. Illustration of this program code is not meant to limit the manner in which other illustrative examples may implement it. As used herein, program code may be in any suitable type of programming language for implementing the specified function or functions. For example, Java, C++, or other types of programming languages may be used.

Figure 6:
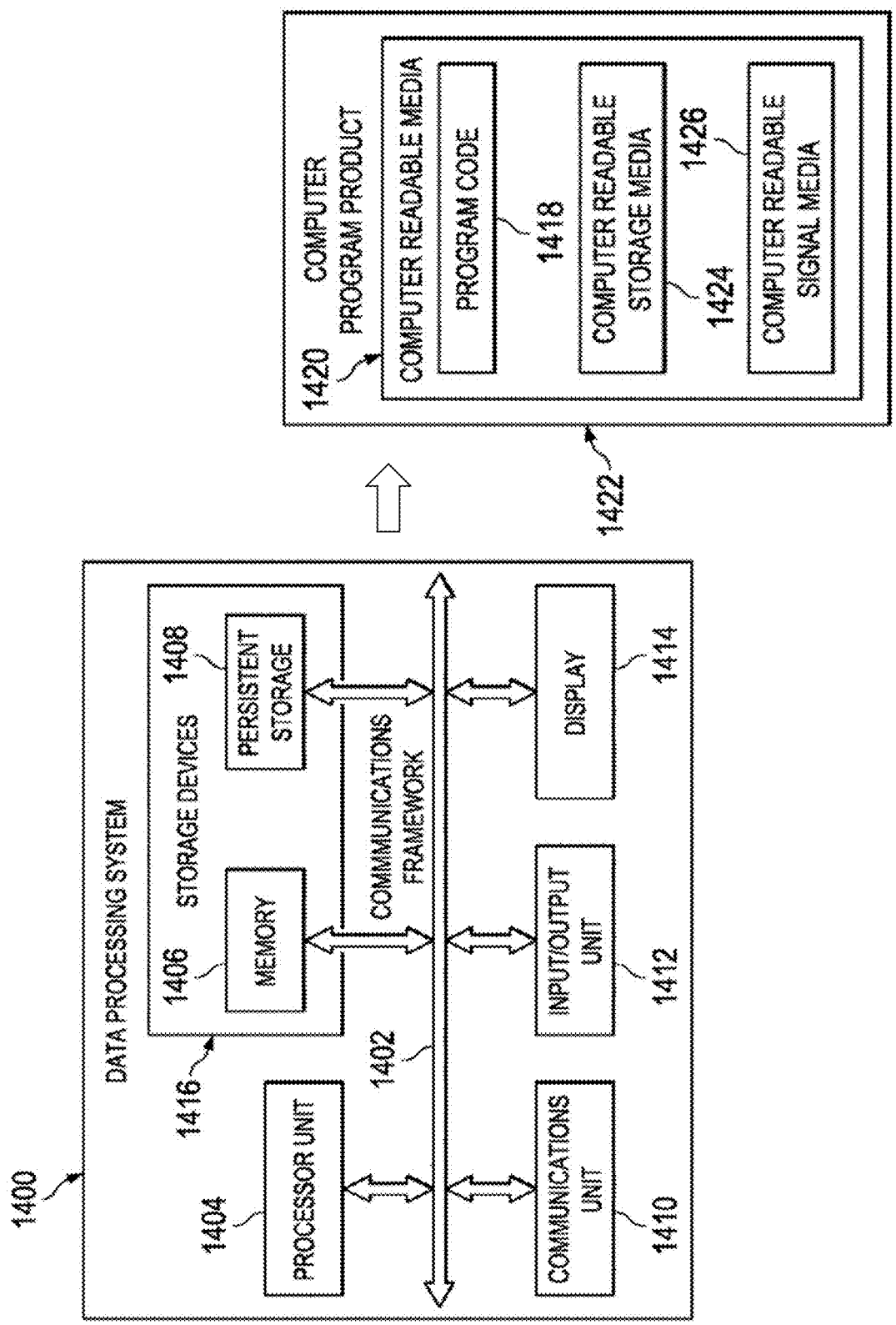
FIG. 6 is an illustration of a block diagram of a data processing system according to the present invention.

Turning now to FIG. 6, an illustration of a block diagram of a data processing system is depicted in accordance with an illustrative embodiment. Data processing system 1400 may be used to implement data processing devices in computer system 106 in FIG. 1.

In this illustrative example, data processing system 1400 includes communications framework 1402, which provides communications between processor unit 1404, memory 1406, persistent storage 1408, communications unit 1410, input/output (1/O) unit 1412, and display 1414. In this example, communications framework 1402 may take the form of a bus system.

Processor unit 1404 runs instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426. In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cables, coaxial cables, wires, or any other suitable types of communications links.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

The description of the different illustrative embodiments has been presented for purposes of illustration and description, and is not intended to be exhaustive or limited to the embodiments in the form disclosed. Many modifications and variations will be apparent to those of ordinary skill in the art.

The different illustrative examples describe components that perform actions or operations. In an illustrative embodiment, a component is configured to perform the action or operation described. For example, the component may have a configuration or design for a structure that provides the component with an ability to perform the action or operation that is described in the illustrative examples as being performable by the component.

Further, different illustrative embodiments may provide different features as compared to other desirable embodiments. The embodiment or embodiments selected are chosen and described in order to best explain the principles of the embodiments, the practical applications, and to enable others of ordinary skill in the art to understand the disclosure for various embodiments with various modifications as are suited to the particular uses contemplated.

The invention being thus described, it will be obvious that the same may be varied in many ways. Such variations and modifications as would be obvious to one skilled in the art are intended to be included within the scope of the following claims.

The invention claimed is:

1. A method for graphically providing status information of a data processing system having a plurality of disjunct system statuses, wherein the method comprises the steps of:
   a) monitoring the data processing system during a predetermined period of time;
   b) gathering a collection of at least one system status of the data processing system monitored during the predetermined period of time and an amount of time that each monitored system status occurred during the predetermined period of time;
   c) selecting out of the collection one particular system status according to a selection criterion;
   d) creating a donut chart having an inner hole region and an outer region having as many segments as a total number of system statuses in the collection minus one;
   e) linking the inner hole region to the one particular system status;
   f) linking each segment of the outer region, if any, to a different system status in the collection which does not equal the one particular system status;
   g) determining an area size of the inner hole region and an area size of each segment in the outer region, each of the area size of the inner hole region and the area size of each segment in the outer region being proportional to the amount of time that the corresponding monitored system status occurred during the predetermined period of time;
   h) displaying the one particular system status in the inner hole region, if monitored; and
   i) displaying each system status in the collection other than the one particular system status in a corresponding linked segment of the outer region, if any.

2. The method according to claim 1, wherein the step b) comprises the sub-steps of:
   gathering, when the data processing system is on-line, a collection of at least one on-line system status and the corresponding amount of time, deriving from a sum of the at least one amount of time of the at least one on-line system status and the predetermined period of time, a time period for an off-line system status of the data processing system; and
   adding the off-line system status and the derived time period to the collection.

3. The method according to claim 2, wherein the one particular system status corresponds to the off-line system status.

4. The method according to claim 3, wherein the method comprises the step of displaying a digital object comprising an advice for the operator of the data processing system when the amount of time that the one particular system status is monitored during the predetermined period of time area exceeds a predetermined time threshold.

5. The method according to claim 3, wherein each segment has a different colour, the inner hole region has a colour which differs from the colours of the segments and the method comprises the step of displaying a legend comprising each colour and a description of the system status corresponding to the colour.

6. The method according to claim 3, wherein each segment as well as the inner hole region are provided with a numerical indication of the amount of time that the corresponding system status is monitored during the predetermined period of time.

7. The method according to claim 2, wherein the method comprises the step of displaying a digital object comprising an advice for the operator of the data processing system when the amount of time that the one particular system status is monitored during the predetermined period of time area exceeds a predetermined time threshold.

8. The method according to claim 2, wherein each segment has a different colour, the inner hole region has a colour which differs from the colours of the segments and the method comprises the step of displaying a legend comprising each colour and a description of the system status corresponding to the colour.

9. The method according to claim 2, wherein each segment as well as the inner hole region are provided with a numerical indication of the amount of time that the corresponding system status is monitored during the predetermined period of time.

10. The method according to claim 1, wherein the method comprises the step of displaying a digital object comprising an advice for the operator of the data processing system when the amount of time that the one particular system status is monitored during the predetermined period of time area exceeds a predetermined time threshold.

11. The method according to claim 10, wherein each segment has a different colour, the inner hole region has a colour which differs from the colours of the segments and the method comprises the step of displaying a legend comprising each colour and a description of the system status corresponding to the colour.

12. The method according to claim 10, wherein each segment as well as the inner hole region are provided with a numerical indication of the amount of time that the corresponding system status is monitored during the predetermined period of time.

13. The method according to claim 1, wherein each segment has a different colour, the inner hole region has a colour which differs from the colours of the segments and the method comprises the step of displaying a legend comprising each colour and a description of the system status corresponding to the colour.

14. The method according to claim 13, wherein the colour of the inner hole region is black, grey or white.

15. The method according to claim 13, wherein each segment as well as the inner hole region are provided with a numerical indication of the amount of time that the corresponding system status is monitored during the predetermined period of time.

16. The method according to claim 1, wherein each segment as well as the inner hole region are provided with a numerical indication of the amount of time that the corresponding system status is monitored during the predetermined period of time.

17. The method according to claim 1, wherein the plurality of system statuses of the data processing system comprises an on-line system status labeled with "busy", an on-line system status labeled with "error", an on-line system status labeled with "maintenance", and an on-line system status labeled with "idle".

18. A data processing system comprising an electronic controller configured to execute the steps of the method according to claim 1.

19. The data processing system according to claim 18, wherein the data processing system is a printing system, the electronic controller is a print controller and the system statuses are printer statuses.

20. A software medium embodied on a non-transitory computer readable medium and comprising executable program code to cause a data processing system to execute the steps of the method according to claim 1.

\* \* \* \* \*